(12) United States Patent
Ohtomo et al.

(10) Patent No.: US 7,110,102 B2
(45) Date of Patent: Sep. 19, 2006

(54) WORKING POSITION MEASURING SYSTEM

(75) Inventors: Fumio Ohtomo, Tokyo-to (JP); Kazuki Osaragi, Tokyo-to (JP); Kunihiro Hayashi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 31 days.

(21) Appl. No.: 10/732,145

(22) Filed: Dec. 10, 2003

(65) Prior Publication Data

US 2004/0125365 A1 Jul. 1, 2004

(30) Foreign Application Priority Data

Dec. 26, 2002 (JP) ............................. 2002-378458

(51) Int. Cl.
*G01C 1/00* (2006.01)
*G01C 1/06* (2006.01)

(52) U.S. Cl. .................. 356/141.4; 356/142; 356/145; 356/147; 356/141.1

(58) Field of Classification Search ............. 356/141.4
See application file for complete search history.

(56) References Cited

U.S. PATENT DOCUMENTS

| 5,767,960 A | * | 6/1998 | Orman | ................... 356/139.03 |
| 5,774,207 A | * | 6/1998 | Yoshida et al. | ............. 356/3.07 |
| 6,286,607 B1 | * | 9/2001 | Ohtomo et al. | .............. 172/4.5 |

* cited by examiner

*Primary Examiner*—Thomas H. Tarcza
*Assistant Examiner*—Luke Ratcliffe
(74) *Attorney, Agent, or Firm*—Nields & Lemack

(57) ABSTRACT

A working position measuring system, comprising a rotary laser device for irradiating and rotating a laser beam and a photodetection sensor device for receiving the laser beam and for detecting a working position, wherein the rotary laser device comprises a laser projector for projecting at least two fan-shaped beams with at least one beam tilted, and the photodetection sensor device comprises at least one photodetection unit for receiving the fan-shaped beams and an arithmetic unit for calculating an elevation angle relative to the rotary laser device based on photodetection signals produced when the photodetection unit receives the light beam.

7 Claims, 11 Drawing Sheets

WORKING POSITION MEASURING SYSTEM

BACKGROUND OF THE INVENTION

The present invention relates to a working position measuring system for projecting a laser beam by rotary irradiation and for measuring a working position from photodetecting condition of the laser beam.

In the past, as a typical device for forming a reference plane by projecting a laser beam by rotary irradiation, a rotary laser device and a photodetection device for receiving the laser beam have been known.

The rotary laser device forms a reference plane by irradiating and rotating a laser beam with a spot-like luminous flux. For instance, by irradiating and rotating the laser beam within a horizontal plane, a horizontal reference plane can be formed. By irradiating and rotating the laser beam within a vertical plane, a vertical reference plane can be formed. By irradiating and rotating the laser beam within a tilted plane, a tilted reference plane can be formed.

The photodetection device comprises a photodetection unit for receiving and detecting the laser beam. Based on the laser beam detected by the photodetection unit, measurement is made to determine a horizontal reference position, a vertical reference position, etc.

When a conventional type working position measuring system is used in a relatively narrow space such as in a room, the photodetection device with the smaller photodetection unit is used. In order that the photodetection unit can receive the laser beam, an operator must move the photodetection device in an upward or downward direction, for instance, and a position of the photodetection device must be aligned so that the photodetection unit can receive the laser beam.

When the working position measuring system is used in a wide outdoor space for civil engineering work by using a construction machine, a range for positioning of the photodetection device with respect to the reference plane is also widened. If the photodetection unit is small, it is difficult to operate manually by the operator, and the photodetection unit is designed in larger size. For instance, when the reference plane to be formed is a horizontal reference plane, the photodetection device is equipped with a photodetection unit of several tens of cm in length in an up-to-bottom direction, and, in some cases, of more than 1 m in length.

In the construction machine represented by a bulldozer, operation control in a plane is performed by a combination operation of the rotary laser device and the photodetection device installed on the construction machine. When the operating condition of the construction machine is to be controlled, a GPS position measuring device is added in some cases, and 3 dimensional operation control is carried out using three from ground positions and elevation. By the GPS position measuring device, a position in a horizontal direction on the ground surface is detected. To detect the direction of elevation, the stable rotary laser device and the photodetection device are used.

FIG. 16 shows a rotary laser device 1 used mostly in indoor operation and a photodetection device 2 for detecting a laser beam 3 projected from the rotary laser device 1.

The photodetection device 2 is arranged, for instance, on a wall (not shown) in an area where the laser beam 3 can reach. Reference numeral 4 denotes a reference line formed by the laser beam 3, and 5 represents a setting reference line to be set at a position deviated from the reference line 4 by a predetermined distance.

FIG. 17 shows the photodetection device 2 to be used in indoor operation. The photodetection device 2 comprises a photodetection unit 6, a display unit 7 with an index for indicating whether a scanning position is at the center or above or under the center when the laser beam 3 passes through the photodetection unit 6, a buzzer 8 for issuing an alarm when the laser beam 3 concurs with the center of the photodetection unit 6, and switches 9 and 10 for switching over the setting of the display unit 7 and the buzzer 8. An index line 12 for indication is marked at a position corresponding to the height at the center of the photodetection unit 6 on the photodetection device 2.

The photodetection unit 6 is designed in rectangular shape with longer side in a vertical direction. The photodetection unit 6 has a pair of photodetection elements 13 and 14 each in form of a right-angle triangle and these two elements are divided by a diagonal line, and the index line 12 is set so as to pass through the center of the photodetection unit 6. A photodetection area of each of the photodetection elements 13 and 14 varies according to the change of the scanning position of the laser beam 3. When the laser beam 3 to form the reference plane passes through the two photodetection elements 13 and 14, each of the photodetection elements 13 and 14 produces an output, which is proportional to a ratio between the areas where the laser beam 3 is projected. A position of the reference line 4 is obtained based on this output, and the setting reference line 5 is marked at a position deviated from the reference line 4 by a predetermined distance.

Next, FIG. 18 shows the rotary laser device 1 and a photodetection device 15 when these are used on a construction machine.

The rotary laser device 1 is fixed on a tripod 16 installed at a predetermined position K, and a reference plane is formed by the laser beam 3 projected from the rotary laser device 1. The photodetection device 15 is fixed on a mounting pole 19 erected on a working tool of the construction machine, e.g. on a blade 18 of a bulldozer 17. When a distance from a ground surface at the predetermined position K to the reference plane is already known and a distance from a reference position of a photodetection unit (not shown) of the photodetection device 15 to a position of an edge 18a of the blade 18 is also already known, ground leveling operation can be carried out as per a planned plane if the development operation is performed in such manner that a photodetection position (light receiving position) of the laser beam 3 on the photodetection unit is maintained at a predetermined position.

FIG. 19 represents the photodetection device 15 to be used primarily on a construction machine.

The photodetection device 15 is fixed on the mounting pole 19 by means of pole clamps 21. A pair of photodetection units 23 (only one of them is shown) is installed on both sides of a main unit 22 of the photodetection device 15. A storage battery receiving unit 24 is arranged at a bottom of the main unit 22. The photodetection unit 23 comprises a multiple of photodetection sensors 25 arranged in a longitudinal direction. By identifying the photodetection sensor 25 receiving the laser beam 3 among the photodetection sensors 25, a photodetecting position of the laser beam 3 can be detected.

Although not shown in the figure particularly, a GPS position measuring device is installed on the construction machine, e.g. the bulldozer 17. An absolute position of the working point can be detected by the GPS position measuring device. By combining the operating position with the operating information at the operating position, 3-dimensional operation can be carried out.

In the photodetection device 2 used in indoor operation, the photodetection unit 6 is very small and of several cm in length. Unless the laser beam 3 is projected within the photodetection range of the photodetection unit 6, the reference position cannot be detected.

When a ground surface is excavated or the ground is filled with soil at a working place in accordance with the reference plane by using a construction machine, e.g. a bulldozer, ground leveling operation must be carried out in many cases on the topographical condition beyond the photodetection range of the photodetection unit 23. In the photodetection device with photodetection range of several tens of cm, photodetection or light receiving is difficult to achieve.

Further, when the GPS position measuring device is used and 3-dimensional operation with difference in height is controlled corresponding to operation zones, the photodetection range of the photodetection unit 23 must cover the changes in height of the working plane in addition to the topographical change. In this type of work, the vertical change of the reference plane crossing the photodetection unit 23 of the photodetection device 15 results in the change of excavating operation in the range of several tens of cm to nearly 1 m.

The blade 18 is moved up and down to cope with the topography, and the photodetection device 15 installed on the blade 18 may not be adequate even when the photodetection device 15 has the photodetection unit 23 of 300 mm in length, for instance. Therefore, in order to widen the photodetection range of the photodetection unit 23, it is designed sometimes in such manner that the mounting pole 19 is made longer or shorter to move the photodetection device 15 itself up or down.

However, problem arises in that the photodetection unit 23 with long length must have a multiple of the short photodetection elements 25 and is very expensive. Also, the device to move the photodetection unit 23 up and down must be designed in complicated structure including a driving unit and a control unit for the driving unit, and the device is very costly.

SUMMARY OF THE INVENTION

It is an object of the present invention to provide a working position measuring system, which is designed in the same structure for indoor and outdoor operations, provides high working efficiency, can detect a reference plane in simple and inexpensive manner, and can measure the reference plane.

To attain the above object, the present invention provides a working position measuring system, which comprises a rotary laser device for irradiating and rotating a laser beam and a photodetection sensor device for receiving the laser beam and for detecting a working position, wherein the rotary laser device comprises a laser projector for projecting at least two fan-shaped beams with at least one beam tilted, and the photodetection sensor device comprises at least one photodetection unit for receiving the fan-shaped beams and an arithmetic unit for calculating an elevation angle relative to the rotary laser device based on photodetection signals produced when the photodetection unit receives the light beam. Also, the present invention provides the working position measuring system as described above, wherein the laser projector has a diffraction grating, and the diffraction grating divides the incident laser beam to at least two fan-shaped beams. Further, the present invention provides the working position measuring system as described above, wherein the photodetection sensor device comprises the photodetection unit, a first GPS position measuring device in a predetermined positional relation with the photodetection unit and a storage unit for storing positional information of the rotary laser device, wherein a position of the photodetection sensor device is calculated from the stored positional information, the elevation angle relative to the rotary laser device, and a detection position of the first GPS position measuring device. Also, the present invention provides the working position measuring system as described above, wherein the photodetection sensor device comprises an input unit, and positional information of the rotary laser device is stored in the storage unit through the input unit. Further, the present invention provides the working position measuring system as described above, wherein the photodetection sensor device comprises a first GPS position measuring device in a predetermined relation with the photodetection unit and a storage unit for storing positional information of the rotary laser device, and the rotary laser device comprises a second GPS position measuring device for specifying an installation position of the rotary laser device, wherein a position of the photodetection sensor device is calculated from the positional information stored in the storage unit, the elevation angle relative to the rotary laser device and detection position of the first GPS position measuring device. Also, the present invention provides the working position measuring system as described above, wherein the positional information of the rotary laser device specified by the second GPS position measuring device is stored in the storage unit. Further, the present invention provides the working position measuring system as described above, wherein the rotary laser device and the photodetection sensor device comprise communication equipment, and an installation position of the rotary laser device specified by the second GPS position measuring device is transmitted to the photodetection sensor device side. Also, the present invention provides the working position measuring system as described above, wherein the second GPS position measuring device is installed at a known point, positional information of the known point is stored in advance in the storage unit of the photodetection sensor device, and a position of the photodetection sensor device is calculated in consideration of an error between the positional information of the known point stored in the storage unit and the positional information specified by the second GPS position measuring device. Further, the present invention provides the working position measuring system as described above, wherein the second GPS position measuring device forms GPS surveying with a third GPS position measuring device installed at a position other than the position of the first GPS position measuring device, the position of the second GPS position measuring device is specified as a reference point, and the position of the photodetection sensor device is calculated based on a coordinate position of the specified point and the detection of the first GPS position measuring device. Also, the present invention provides the working position measuring system as described above, wherein the photodetection sensor device is arranged on a construction machine, the photodetection sensor device is operated with an excavator control unit of the construction machine, and the excavation control unit controls a height position of excavation at a working position based on a height detected or calculated by the photodetection sensor device. Further, the present invention provides the working position measuring system as described above, wherein the photodetection sensor device is provided on a construction machine, the photodetection sensor device and the first GPS position measuring device installed on the photodetection sensor device side are operated with an excavation control unit of the construction machine, and the excavation control unit controls a height position of excavation at the working position based on the height detected or calculated by the photodetection sensor device. Also, the present invention provides the working position measuring system as described above, wherein the photodetection sensor device is provided on a construction machine, the photodetection sensor device and the first GPS position measuring device installed on the photodetection sensor device side are operated with an excavation control unit of the construction machine having working position information, and the excavation control unit controls a height position of excavation at the working position based on a height detected or calculated by the photodetection sensor device.

DETAILED DESCRIPTION OF THE PREFERRED EMBODIMENT

Figure 1:
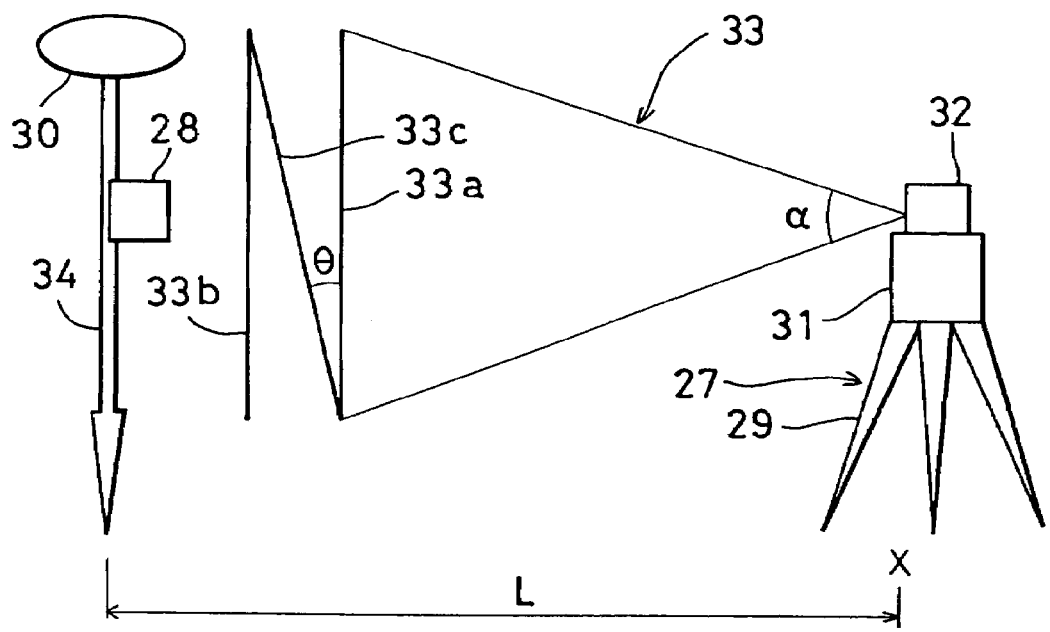
FIG. 1 is a schematical drawing of an embodiment of the present invention.

Description will be given below on embodiments of the present invention referring to the drawings.

First, general features of a working position measuring system of the present invention are described referring to FIG. 1.

The working position measuring system primarily comprises a rotary laser device 27 for projecting a fan-shaped beam by rotary irradiation and a photodetection sensor device 28 for receiving the fan-shaped beam.

A tripod 29 is installed so that the tripod is approximately aligned with a known point X, and the rotary laser device 27 is mounted on the tripod 29. The rotary laser device 27 comprises a main unit 31 and a rotator 32 rotatably mounted on the main unit 31. A laser beam 33 is projected by rotary irradiation from the rotator 32. The photodetection sensor device 28 is supported by a predetermined supporting means. FIG. 1 shows how the device of the present invention is operated in field operation. The photodetection sensor device 28 is installed on a rod 34, which can be manually carried by an operator. On an upper end of the rod 34, there is provided a GPS position measuring device 30. By the GPS position measuring device 30, an absolute position on the ground can be measured based on a signal from an artificial satellite. A height of the GPS position measuring device 30 from the ground surface is measured.

The laser beam 33 comprises a plurality of fan-shaped laser beams. For instance, the laser beam 33 comprises fan-shaped beams 33a and 33b in a vertical direction and a fan-shaped beam 33c tilted diagonally with respect to the fan-shaped beams 33a and 33b at an angle of θ, forming an N-shaped configuration. Also, the laser beams 33a and 33b are projected in a direction of ±δ with a spreading angle of α respectively (See FIG. 6). The fan-shaped beams 33a and 33b need not run in vertical directions so far as the fan-shaped beams 33a and 33b run in parallel to each other and perpendicularly cross a horizontal plane.

Figure 2:
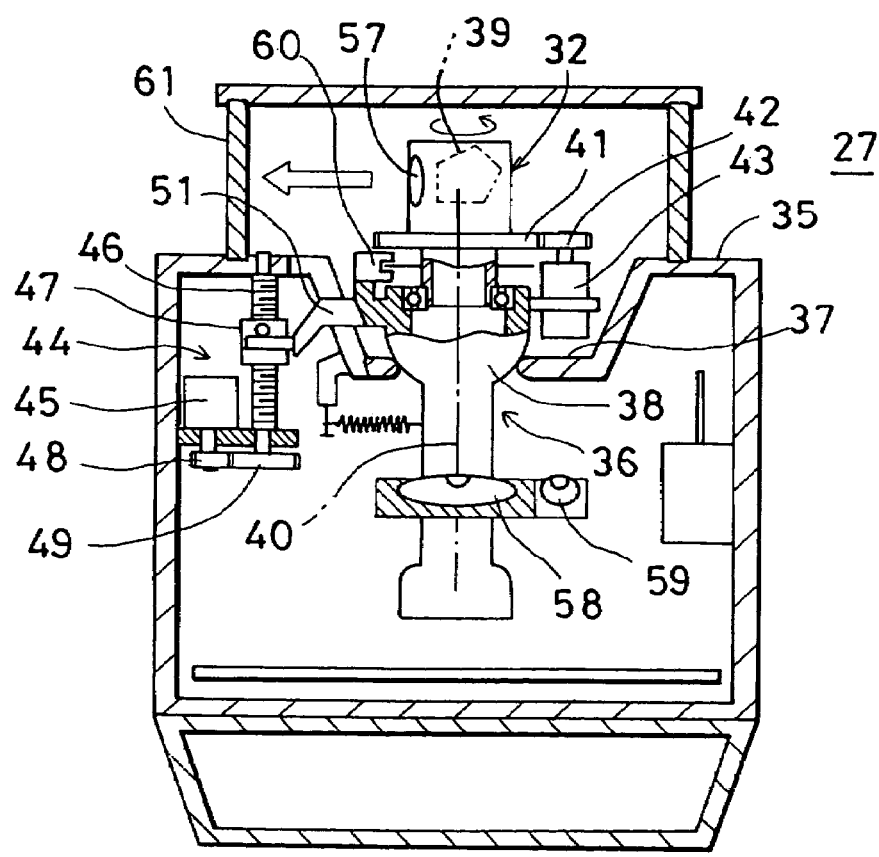
FIG. 2 is a cross-sectional view of a rotary laser device used in the embodiment of the present invention.
Figure 3:
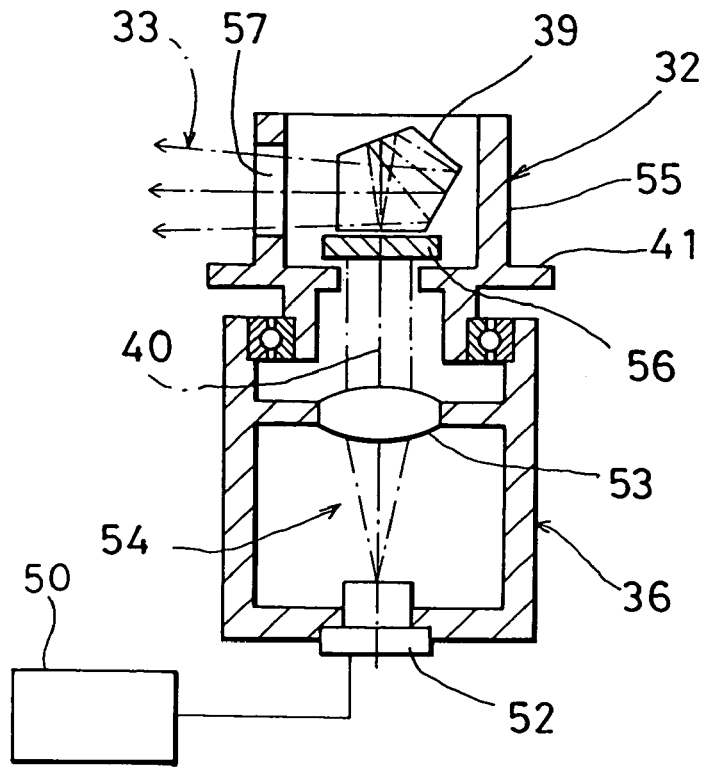
FIG. 3 is a cross-sectional view of a laser projector of the rotary laser device.

Now, description will be given on the rotary laser device 27, referring to FIG. 2 and FIG. 3.

The rotary laser device 27 according to the present embodiment comprises a casing 35 and a laser projector 36 having a projection optical axis 40 (to be described later). The laser projector 36 is tiltably accommodated in the casing 35.

A recessed portion 37 in form of a truncated cone is formed at the center of an upper surface of the casing 35, and the laser projector 36 is penetrating the center of the recessed portion 37 in a vertical direction. The projector 36 is supported on the recessed portion 37 via a spherical seat 38 so that the projector 36 can be tilted. The rotator 32 is rotatably mounted on an upper portion of the laser projector 36, and a pentagonal prism 39 is mounted on the rotator 32.

A scanning gear 41 is arranged on the rotator 32, and a scanning motor 43 having a driving gear 42 is mounted on the laser projector 36. The rotator 32 is rotated and driven by the scanning motor 43 via the driving gear 42 and the scanning gear 41.

Two sets of tilting mechanisms 44 (only one of them is shown) arranged around the laser projector 36 are accommodated in the casing 35. Each of the tilting mechanisms 44 comprises a tilting motor 45, a tilting screw 46 having the center of rotation in a direction parallel to the laser projector 36, and a tilting nut 47 screwed on the tilting screw 46.

The laser projector 36 has two tilting arms 51 (only one of them is shown), which are extended in a direction perpendicular to the projection optical axis 40. The two tilting arms 51 are crossing each other. At a tip of the tilting arm 51, a pin with circular cross-section is protruded, and the tilting arm 51 is engaged with the tilting mechanism 44 via the pin.

The tilting motor 45 can rotate the tilting screw 46 via the driving gear 48 and the tilting gear 49. By the rotation of the tilting screw 46, the tilting nut 47 is moved up or down. By the vertical movement of the tilting nut 47, the tilting arm 51 is tilted, and the laser projector 36 is tilted. Another set of the tilting mechanism not shown in the figure tilts the laser projector 36 in a direction perpendicular to the tilting direction of the above tilting mechanism 44 by the same mechanism as the above tilting mechanism 44.

There are provided a fixed tilt sensor 58 in parallel to the tilting arm 51 and a fixed tilt sensor 59 running perpendicularly to the tilting arm 51 in a middle portion of the laser projector 36. A tilt angle in any direction of the laser projector 36 can be detected by the fixed tilt sensor 58 and the fixed tilt sensor 59. Based on the detection results of the fixed tilt sensor 58 and the fixed tilt sensor 59, the laser projector 36 is tilted via the two tilting arms 51 by the two sets of the tilting mechanisms 44, and the laser projector 36 can be controlled always in a vertical direction. Also, the laser projector 36 can be tilted at any angle as desired.

Now, description will be given on the laser projector 36 and the rotator 32 referring to FIG. 3.

A laser beam emitting unit 52 and a collimator lens 53, etc., which are arranged on the projection optical axis 40, make up together a projecting optical system 54. The projecting optical system 54 is accommodated in the laser projector 36.

The rotator 32 comprises a prism holder 55, and the prism holder 55 supports the pentagonal prism 39 and a diffraction grating (BOE) 56 provided under the pentagonal prism 39.

The laser beam 33 emitted from the laser beam emitting unit 52 is turned to a parallel luminous flux by the collimator lens 53 and enters the diffraction grating 56. The incident laser beam 33 is divided by the diffraction grating 56 so as to form a plurality of fan-shaped laser beams, for instance, three fan-shaped beams 33a, 33b and 33c. The fan-shaped beams 33a, 33b and 33c are deflected in a horizontal direction by the pentagonal prism 39 and are projected through a projection window 57 of the prism holder 55.

The diffraction grating 56 may be placed at such a position that the laser beam 33 passes through the diffraction grating 56 after being deflected by the pentagonal prism 39. In FIG. 2, reference numeral 60 denotes an encoder for detecting a rotation angle of the rotator 32, and 61 denotes a transparent cover in cylindrical shape.

Light emitting condition of the laser beam emitting unit 52 is controlled by a light emission control unit 50. For instance, communication data can be superimposed on the laser beam 33 by a method such as modulation of the laser beam 33, and data such as position information of the rotary laser device 27 can be sent to the photodetection sensor device 28 via optical communication.

As the communication means, a wireless communication equipment may be provided separately, and the data may be transmitted via wireless communication to the photodetection sensor device 28.

Figure 4:
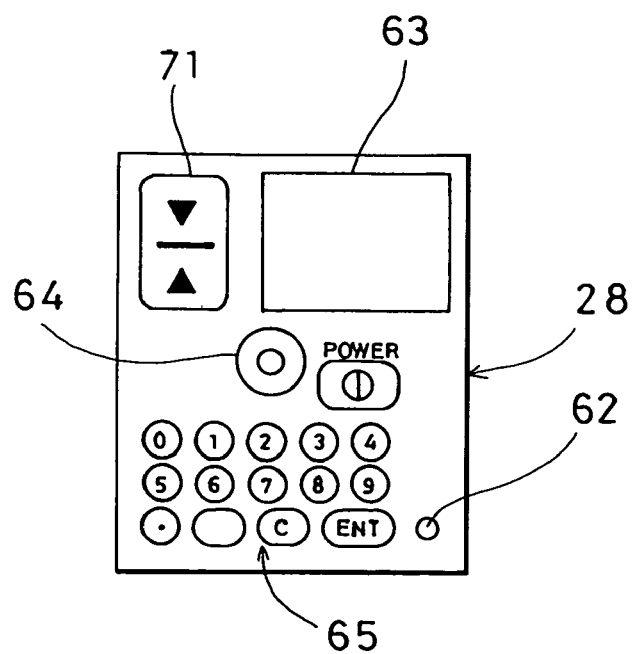
FIG. 4 is a front view of a photodetection sensor device used in the embodiment of the present invention.
Figure 5:
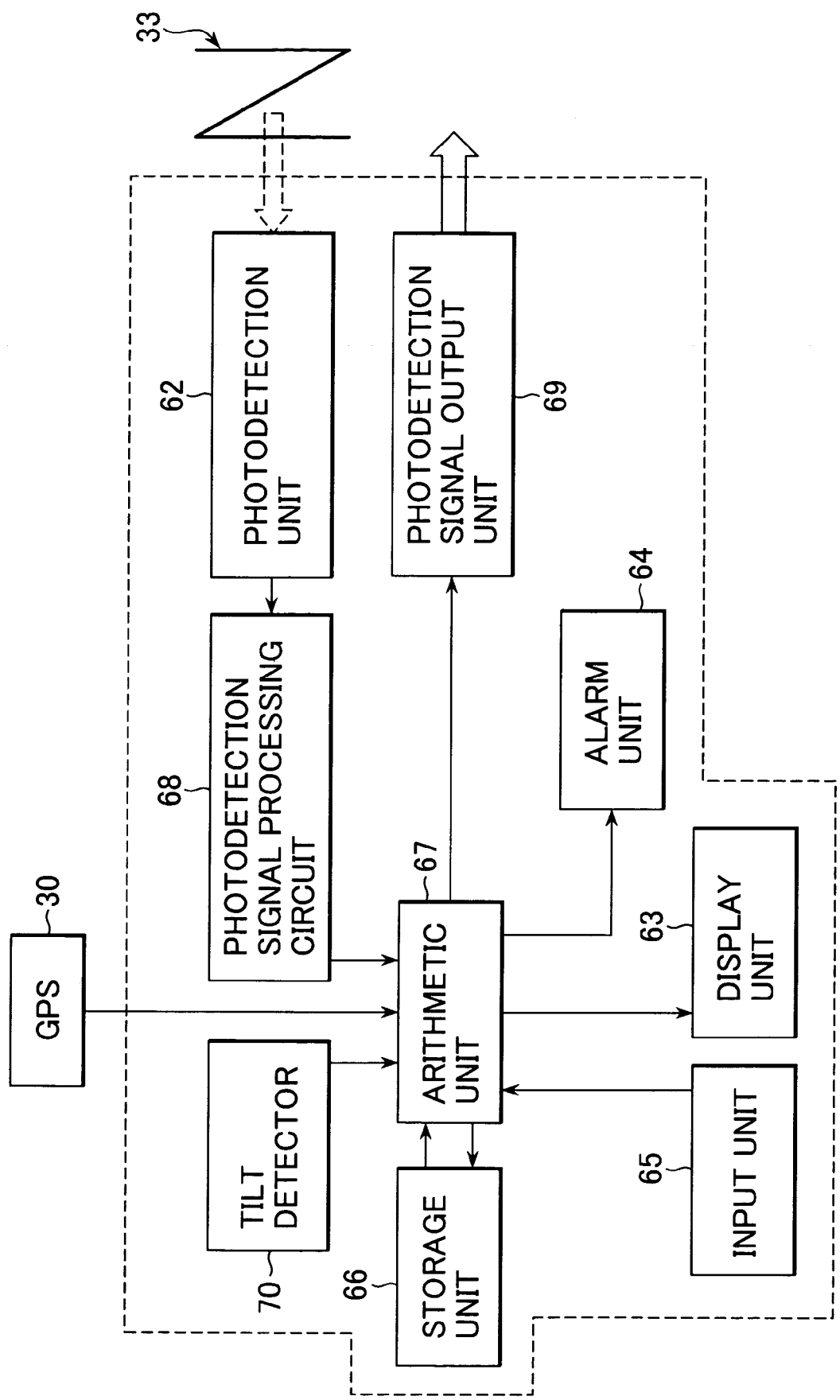
FIG. 5 is a schematical block diagram of an embodiment of the present invention.

Next, description will be given on the photodetection sensor device 28 referring to FIG. 4 and FIG. 5.

A photodetection unit 62 for detecting the fan-shaped beams 33a, 33b and 33c is mounted on the photodetection sensor device 28. The photodetection sensor device 28 comprises a display unit 63, an alarm unit 64 (e.g. a buzzer) and an input unit 65 (e.g. input keys). Further, a storage unit 66, an arithmetic unit 67, a photodetection signal processing circuit 68, a photodetection signal output unit 69, and a tilt detector 70 for detecting the tilting of the rod 34 are incorporated in the photodetection sensor device 28.

Figure 8:
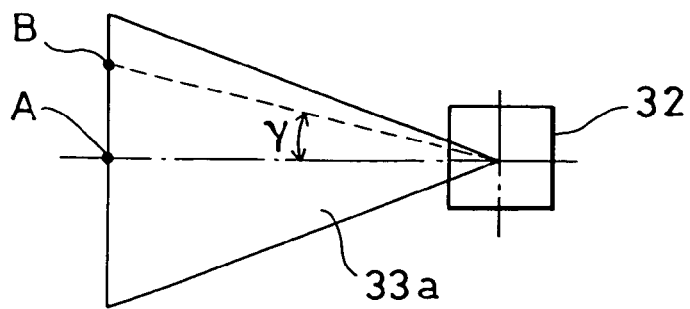
FIG. 8 is a side view to explain operation of the embodiment of the present invention.
Figure 9:
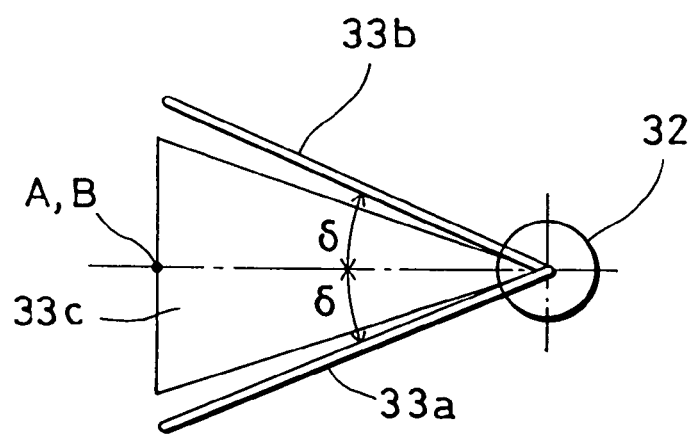
FIG. 9 is a plan view to explain operation of the embodiment of the present invention.

On the display unit 63, the following data are displayed: For instance, an absolute position detected by the GPS position measuring device 30, a position of the photodetection sensor device 28 calculated based on the detection of the GPS position measuring device 30, a height of the photodetection sensor device 28, an angle between a line connecting the rotary center of the laser beam 33 with the photodetection unit 62 and a horizontal reference plane (elevation angle $\gamma$ (See FIG. 8)), and tilting of the rod 34 detected by the tilt detector 70. On the photodetection sensor device 28, there is provided an index display unit 71 which has an index having a center line and upper and lower triangular marks. In case the photodetection unit 62 is at a horizontal position in the laser beam 33, it is indicated by the center line. In case the photodetection unit 62 is above or under the horizontal position in the laser beam 33, it is indicated by the triangular marks.

Photodetection signals of the fan-shaped beams 33a, 33b and 33c from the photodetection unit 62 are inputted to the photodetection signal processing circuit 68 to detect whether the light beam has been received or not. Also, the photodetection signal processing circuit 68 performs required signal processing such as A/D conversion. The communication data superimposed on the fan-shaped beams 33a, 33b and 33c are extracted and analyzed, and are inputted to the arithmetic unit 67. Based on the signals from the photodetection signal processing circuit 68, a distance L and an elevation angle $\gamma$ are calculated at the arithmetic unit 67. Further, position information of the rotary laser device 27 obtained from the communication data is inputted to the storage unit 66.

The position information may be inputted to the storage unit 66 in advance by the input unit 65. In case the rotary laser device 27 is equipped with a wireless communication equipment as communication means, a wireless receiver is installed on the photodetection sensor device 28.

The photodetection signal output unit 69 outputs the results obtained from the calculation by the arithmetic unit 67. The output from the photodetection signal output unit 69 is used as a signal for driving the index display unit 71 or it is used when a construction machine, etc. is controlled as described later.

Description will be given below on operation referring to FIG. 6 to FIG. 10.

The rotary laser unit 27 is installed via the tripod 29 at a known point X. Based on the detection results of the fixed tilt sensor 58 and the fixed tilt sensor 59, the tilting mechanisms 44 are driven, and the laser projector 36 is adjusted to be aligned with a vertical line.

The rod 34 is installed at a target position. At a predetermined position on the rod 34, i.e. at a known height from the ground surface, the photodetection sensor device 28 is mounted. Information of the known point X is inputted from the input unit 65 to the photodetection sensor device 28, and the information is stored in the storage unit 66 via the arithmetic unit 67. By the GPS position measuring device 30, an absolute position in a horizontal direction of the rod 34 and an absolute position including absolute height of the GPS position measuring device 30 are measured.

In the operation using a construction machine, there are strong demands on the accuracy in a height direction. The GPS position measuring device 30 does not provide very high accuracy in height because of its characteristics of system. For this reason, the height direction is measured by a combination of the rotary laser device 27 for projecting the fan-shaped beams by rotary irradiation and the photodetection sensor device 28.

Because positional relation between the GPS position measuring device 30 and the photodetection sensor device 28 is already known, a horizontal position of the photodetection sensor device 28 can be obtained from the relation with the GPS position measuring device 30.

The height of the photodetection sensor device 28, i.e. a height of the photodetection unit 62, is calculated based on the distance L and the elevation angle γ as to be described later.

The distance L can be calculated from the positional information of the rotary laser device 27 inputted to the storage unit 66 by the arithmetic unit 67 and from the horizontal position of the photodetection sensor device 28 obtained from the measurement result of the GPS position measuring device 30. The elevation angle γ can be calculated by the arithmetic unit 67 when the fan-shaped beams 33*a*, 33*b* and 33*c* are received by the photodetection unit 62. An error in height direction of the photodetection unit 62 caused by tilting of the rod 34 is corrected based on a tilt angle of the rod 34 detected by the tilt detector 70. When the photodetection unit 62 is beyond the photodetection range of the laser beam 33, for instance, the alarm unit 64 issues an alarm signal such as buzzer to attract the attention of the operator.

Figure 6:
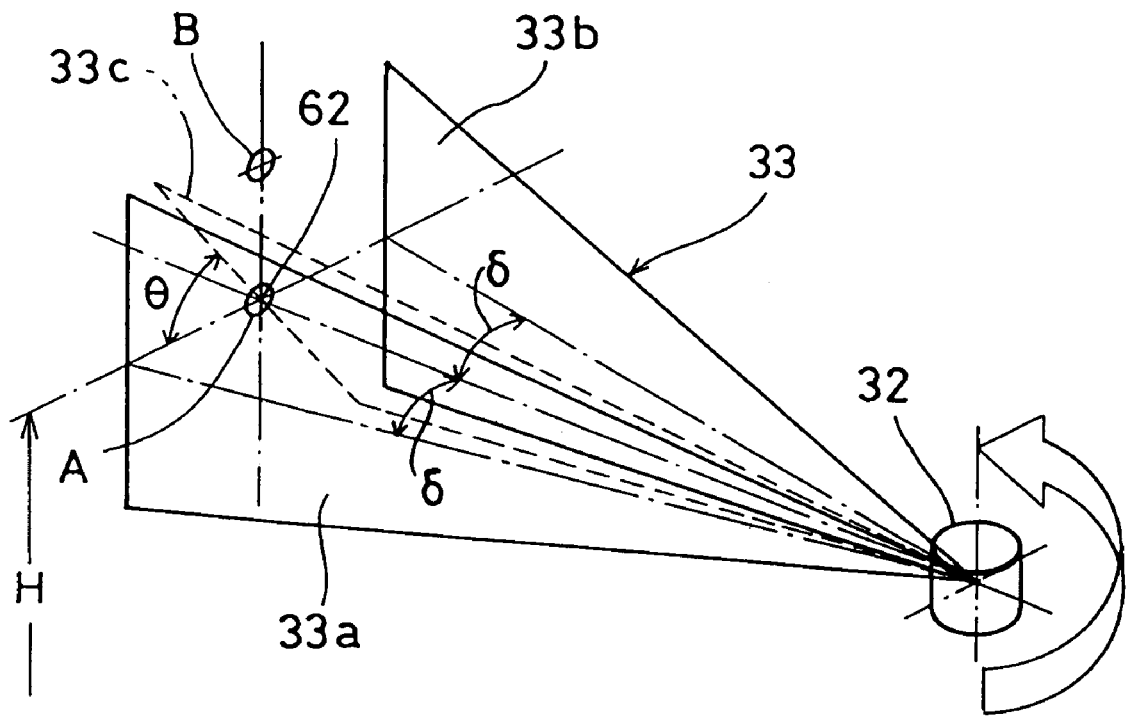
FIG. 6 is a perspective view to explain operation of the embodiment of the present invention.

Now, description will be given on the elevation angle γ and elevation difference H with respect to the horizontal line at the position of the photodetection sensor device 28 referring to FIG. 6. FIG. 6 shows the relation between the photodetection unit 62 and the laser beam 33.

The laser beam 33 is irradiated and rotated and the laser beam 33 runs across the photodetection unit 62. Because the fan-shaped beams 33*a*, 33*b* and 33*c* make up together the laser beam 33, the laser beam can be received even when the photodetection unit 62 is a spot-like photodetection element, and there is no need to perform accurate positioning of the photodetection sensor device 28.

When the laser beam 33 runs across the photodetection unit 62, the fan-shaped beams 33*a*, 33*b* and 33*c* pass through the photodetection unit 62 respectively. From the photodetection unit 62, three photodetection signals 72*a*, 72*b* and 72*c* corresponding to the fan-shaped beams 33*a*, 33*b* and 33*c* respectively are issued.

Figure 10A:
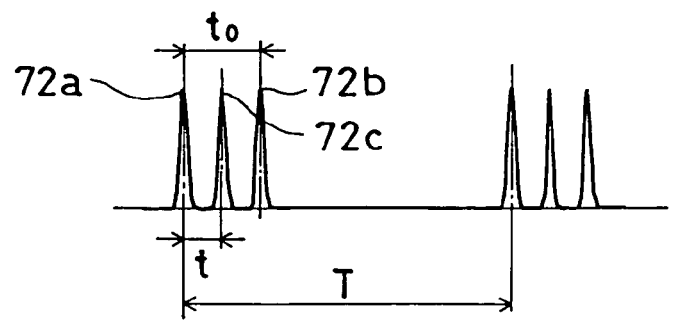
FIG. 10(a) and FIG. 10(B) each represents a diagram of a photodetection signal of the photodetection sensor device.

When the photodetection unit 62 is at a point A as shown in FIG. 6 to FIG. 9 with respect to the laser beam 33, i.e. when the photodetection unit 62 is at the center of the laser beam 33, the photodetection signal is indicated as shown in FIG. 10(A), and time interval between three photodetection signals 72*a*, 72*c*, and 72*b* is equalized. In the figure, the symbol T represents a cycle, in which the rotary laser device 27 is rotated by one turn.

Figure 7:
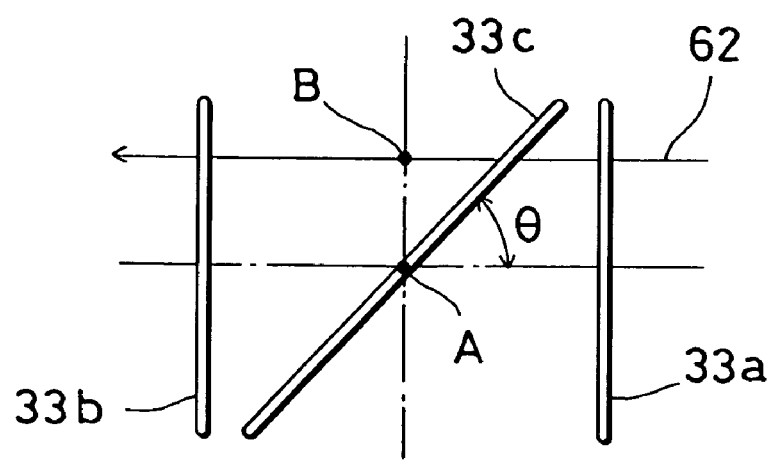
FIG. 7 is a front view to explain operation of the embodiment of the present invention.
Figure 10B:
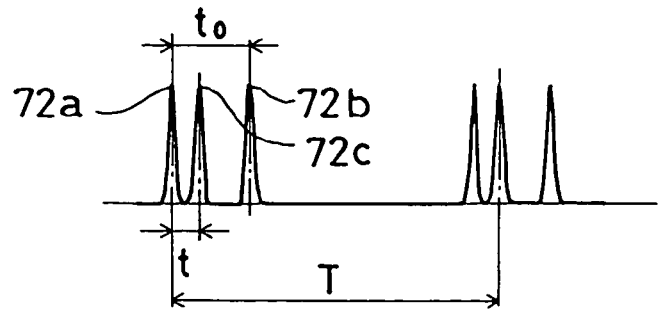

When the photodetection unit 62 is deviated from the center of the laser beam 33 and the photodetection unit 62 is at a point B as shown in FIG. 6 to FIG. 9, time interval between the photodetection signals 72*a*, 72*c*, and 72*b* is different from each other (See FIG. 10(B)). In FIG. 7, when the photodetection unit 62 moves relatively from the right to the left in the figure, the interval between the photodetection signals 72*a* and 72*c* becomes shorter, and the interval between the photodetection signals 72*c* and 72*b* becomes longer.

The configuration shown in FIG. 6 has a similar figure regardless of the distance between the photodetection sensor device 28 and the rotator 32. Thus, by obtaining a time interval ratio, it is possible to calculate a passing position in each configuration, which is turned to dimensionless. The elevation angle γ up to the position of the point B with the rotary laser device 27 at the center can be promptly calculated. From the elevation angle γ and the distance L, the elevation difference H with respect to the horizontal line at the position of the photodetection sensor device 28 can be measured.

Therefore, the difference of elevation with respect to the reference plane can be measure without moving the photodetection sensor device 28 up or down.

The configuration formed by a plurality of fan-shaped beams may not be an N-shaped configuration and it is admitted if at least one of the fan-shaped beams is tilted and the configuration data such as a tilt angle is already known. Also, a plurality of fan-shaped beams may be two fan-shaped beams and it is admitted that at least one of the fan-shaped beam is tilted.

Figure 11:
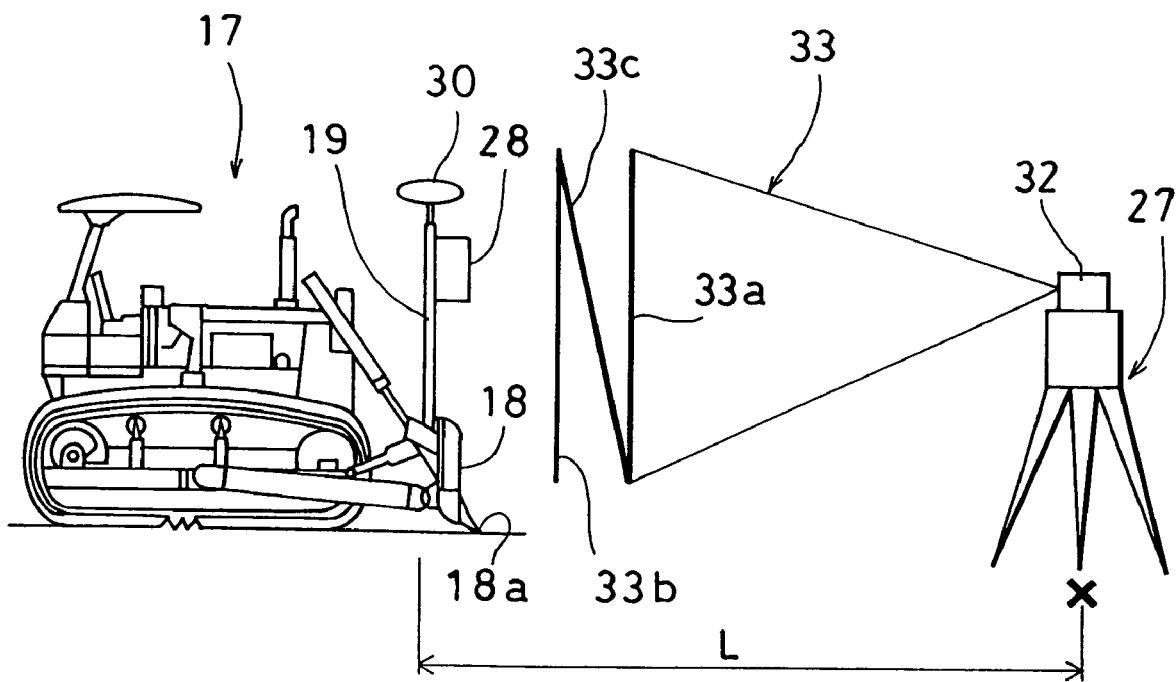
FIG. 11 is a schematical drawing of a second embodiment of the present invention.

FIG. 11 shows a second embodiment of the present invention, in which the present invention is applied to a construction machine such as a bulldozer.

Figure 18:
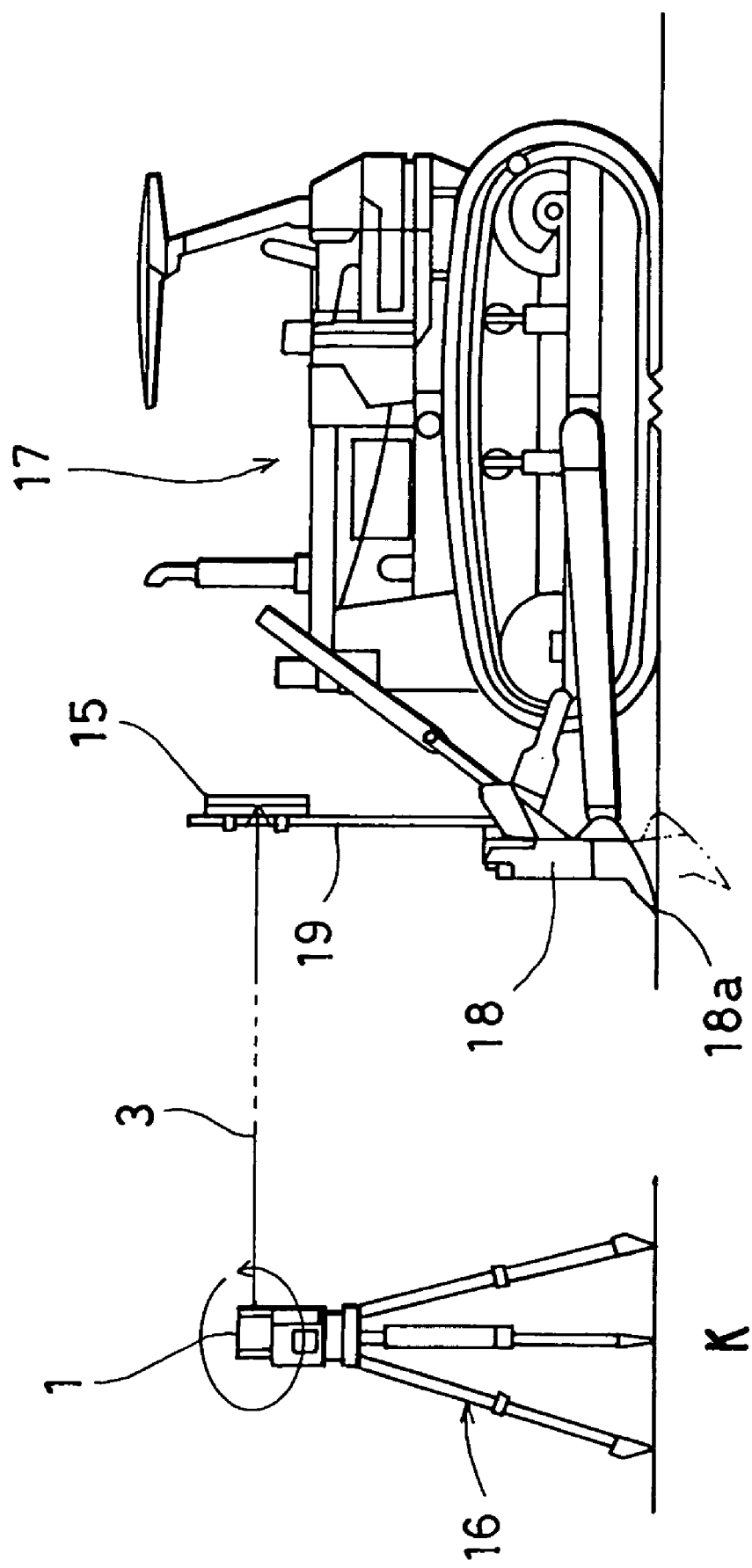
FIG. 18 is a schematical drawing of another conventional example.
Figure 19:
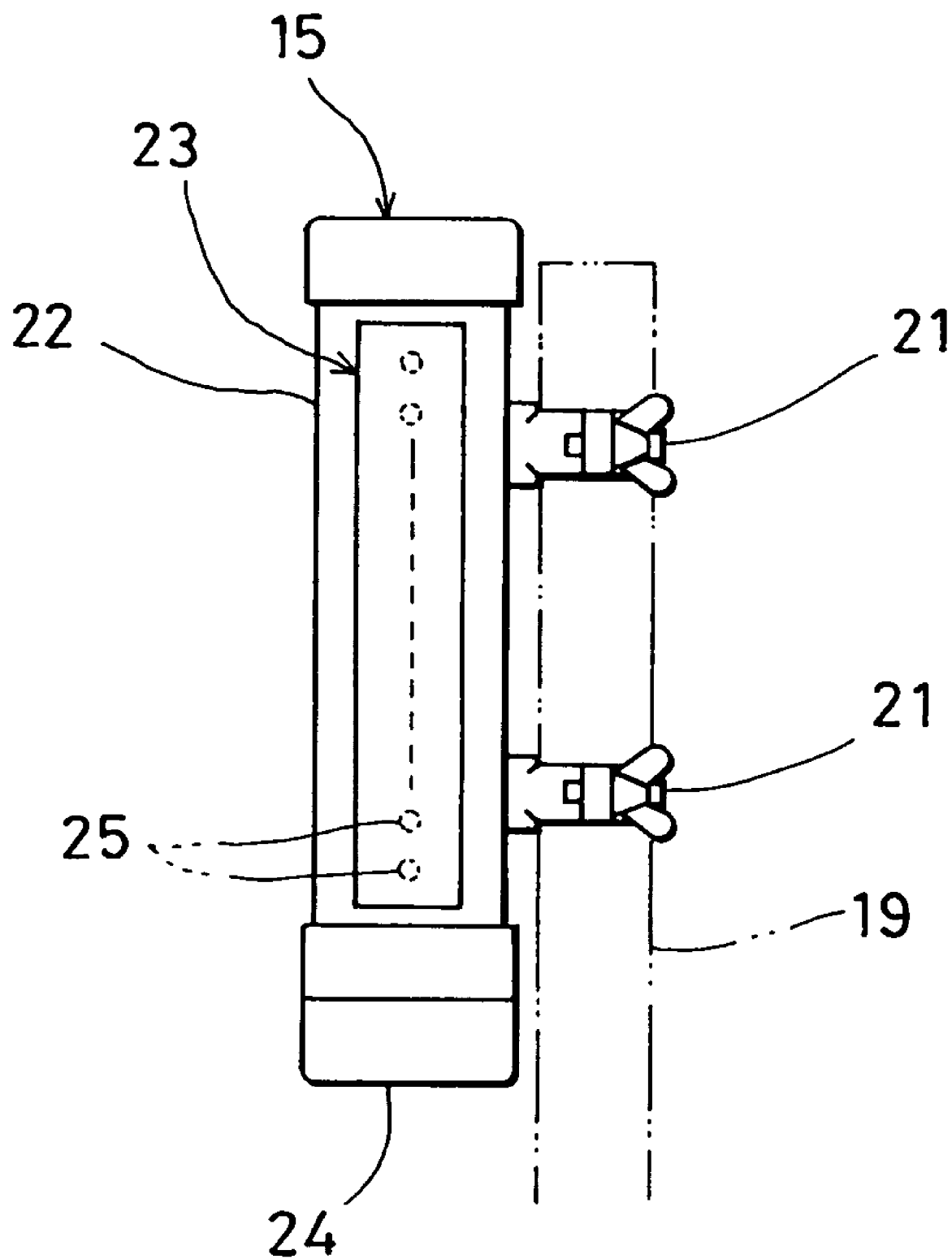
FIG. 19 is a drawing to explain a photodetection device of another conventional example.

In FIG. 11, the equivalent component as shown in FIG. 18 is referred by the same symbol.

The photodetection sensor device 28 is fixed on a working tool of the construction machine, e.g. on a blade 18 of a bulldozer 17. A mounting pole 19 is erected on the blade 18, and the photodetection sensor device 28 is mounted on the mounting pole 19, and a GPS position measuring device 30 is installed at an upper end of the mounting pole 19. The bulldozer 17 comprises an excavation operation control unit (not shown) such as computer to control the operation of the blade 18.

Because the laser beam 33 is fan-shaped, the photodetection sensor device 28 can detect the laser beam 33 even when the photodetection sensor device 28 is moved up and down in association with vertical movement of the blade 18.

The absolute position of the photodetection sensor device 28 can be determined by the GPS position measuring device 30. Because the position of the photodetection sensor device 28 and the distance up to a blade edge 18*a* of the blade 18 are already known, the position of the blade edge 18*a* can be detected by the detection of the position of the photodetection sensor device 28. Therefore, the information of the photodetection sensor device 28 thus detected can be used for the control of elevation of the blade 18 of the bulldozer 17. Specifically, the excavation operation control unit controls a hydraulic cylinder which moves the blade 18 up and down, and the excavation operation can be controlled.

When the present invention is applied to operation of a construction machine such as the bulldozer, the photodetection unit 62 of the photodetection sensor device 28 may be a spot-like photodetection element. This contributes to extremely simpler design of the photodetection sensor device 28, and a lifting mechanism for expanding the photodetection range of the photodetection sensor device 28 may not be used.

In FIG. 1 and FIG. 11, description has been given to a case where the GPS position measuring device 30 is installed only on the photodetection sensor device 28 side to show basic elements of the working position measuring system. In reality, the GPS position measuring device can measure the position by itself. However, when high accuracy is required, a plurality of GPS position measuring devices are used, and static surveying or RTK surveying (dynamic surveying) which is used primarily for a mobile body is carried out. In the system shown in FIG. 1 and FIG. 11, it may be designed in such manner that a position of a moving point is obtained at high accuracy with a GPS position measuring device not shown in the figure.

Next, referring to FIG. 12 to FIG. 15, description will be given on an embodiment where the GPS position measuring device is installed also on the rotary laser device 27 side. In FIG. 12 to FIG. 15, the same component as shown in FIG. 1 or in FIG. 11 is referred by the same symbol.

Figure 12:
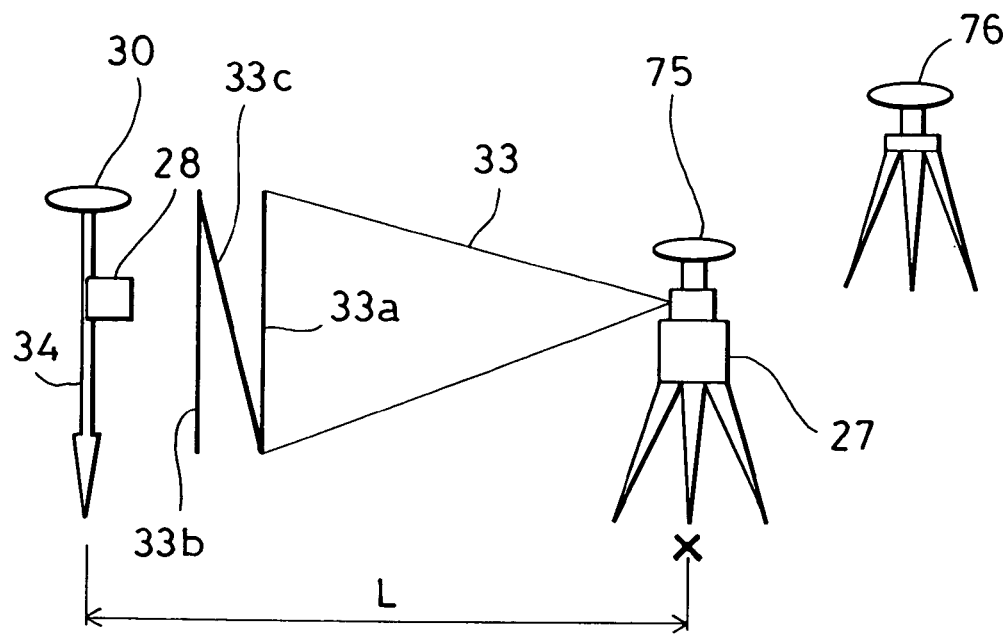
FIG. 12 is a schematical drawing of a third embodiment of the present invention.
Figure 13:
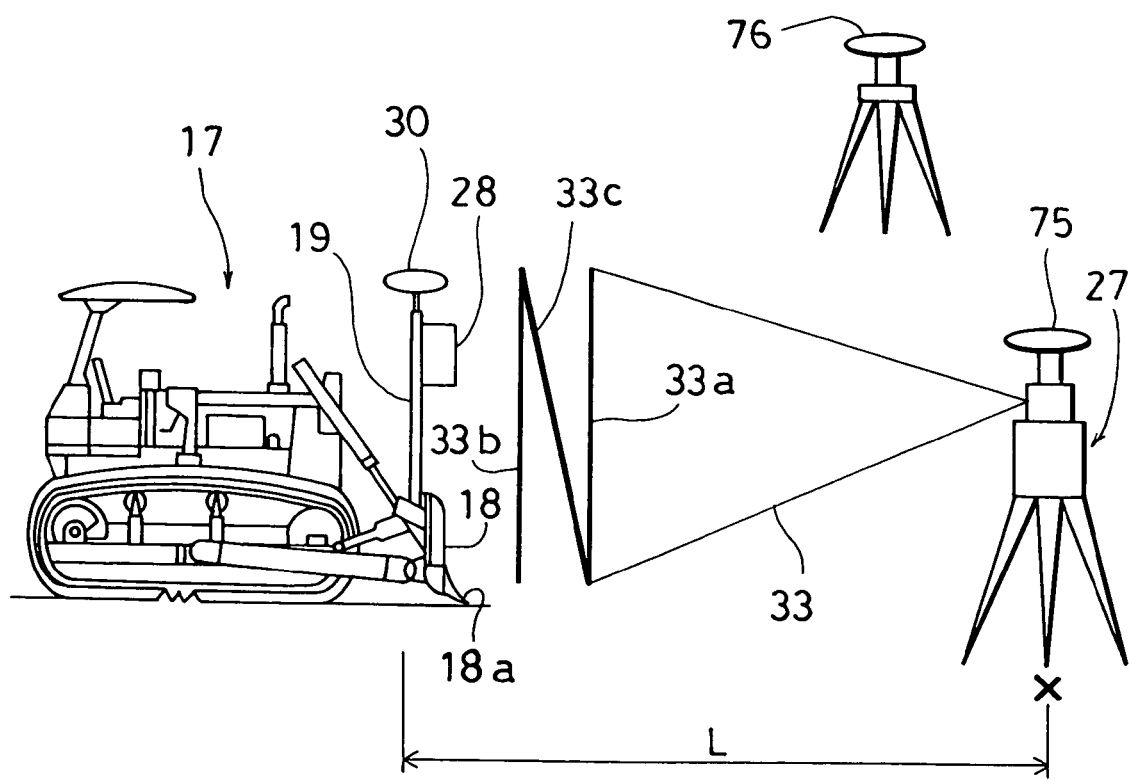
FIG. 13 is a schematical drawing of a fourth embodiment of the present invention.

In a third embodiment and a fourth embodiment shown in FIG. 12 and FIG. 13 respectively, the GPS position measuring device 30 and a GPS position measuring device 75 are installed on the rod 34 and the rotary laser device 27 respectively, and a third GPS position measuring device 76 is provided at an adequate position. The rotary laser device 27 is installed at an unknown point. Based on the result of measurement of the unknown point by static surveying, an installation point of the rotary laser device 27 is set as a known point.

In order to carry out the static surveying, the third GPS position measuring device 76 is installed at a position separated from the rotary laser device 27. For instance, this may be an electronic reference point installed by the Government. The third GPS position measuring device 76 and the GPS position measuring device 75 installed on the rotary laser device 27 are used for the static surveying, and an unknown point where the rotary laser device 27 is installed is measured. The position of the unknown point, which is now turned to the known point, is inputted to the photodetection sensor device 28 as position information.

The horizontal position of the photodetection sensor device 28 can be obtained from the relation with the GPS position measuring device 30 mounted on the upper end of the rod 34. The height is calculated from the distance L, which is obtained from the position information of the rotary laser device 27 and the position of the photodetection sensor device 28 based on the GPS position measuring device 30, and also from the elevation angle γ obtained from the fan-shaped beams 33a, 33b and 33c. The position including the height of the photodetection sensor device 28 can be calculated.

If a distance between the tip of the rod 34 and the photodetection sensor device 28 is already known, the position of the tip of the rod 34 can be easily obtained. Further, the value of height can be easily corrected even when the rod 34 is tilted because the tilt detector 70 is incorporated in the photodetection sensor device 28.

As shown in FIG. 13, when the photodetection sensor device 28 and the GPS position measuring device 30 are installed on an excavating tool such as the blade 18 of the bulldozer 17 via the mounting pole 19, height of the blade edge 18a of the blade 18 can be detected. The blade 18 is controlled by the excavation operation control unit such as a computer. If it is designed in such manner that signals from the photodetection sensor device 28 and the GPS position measuring device 30 are inputted to the excavation operation control unit, the operation can be easily controlled.

Working drawings and working elevation are stored in the excavation operation control unit in association with each other. From the coordinate position obtained based on the GPS position measuring device 30 and from the working drawings and the working elevation, the difference of elevation from the blade edge 18a of the blade 18 at the coordinate point is obtained by the excavation operation control unit, and it is controlled so that the difference is turned to zero. Specifically, by controlling the hydraulic cylinder, which moves the blade 18 up and down, the excavation operation can be controlled.

In the rotary laser device 27 for projecting the fan-shaped beams 33a, 33b and 33c, sufficient photodetection range can be maintained even when the photodetection unit 62 of the photodetection sensor device 28 is not long enough, and the control can be performed so that the difference is turned to zero. The height control can be achieved if there is at least one photodetection sensor. Because there are less photodetection sensors, the photodetection sensor device 28 is lightweight and is easy to handle. By simply mounting it, the blade 18 can be easily controlled.

Figure 14:
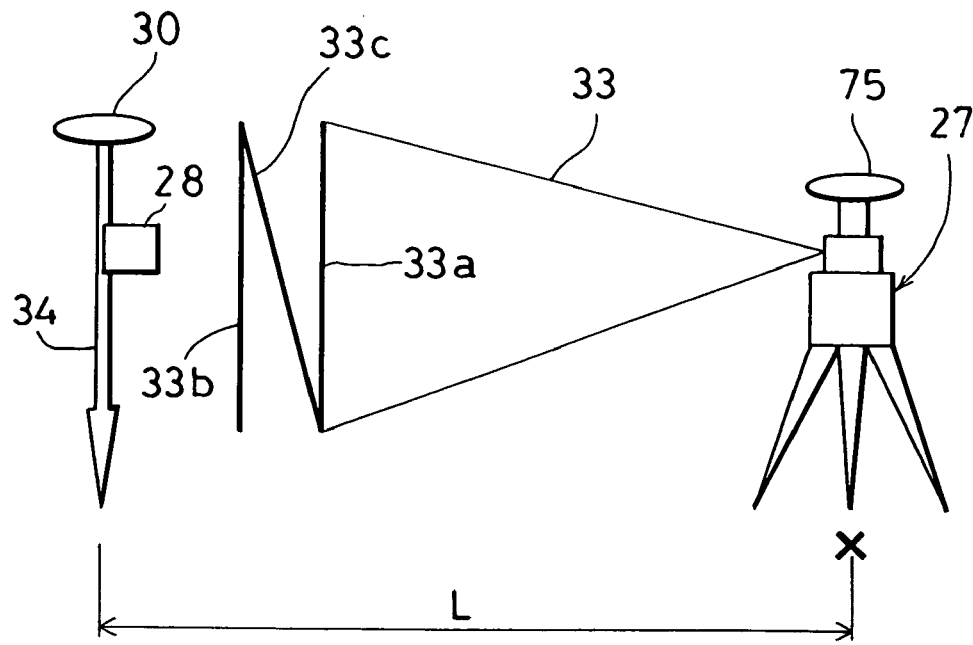
FIG. 14 is a schematical drawing of a fifth embodiment of the present invention.
Figure 15:
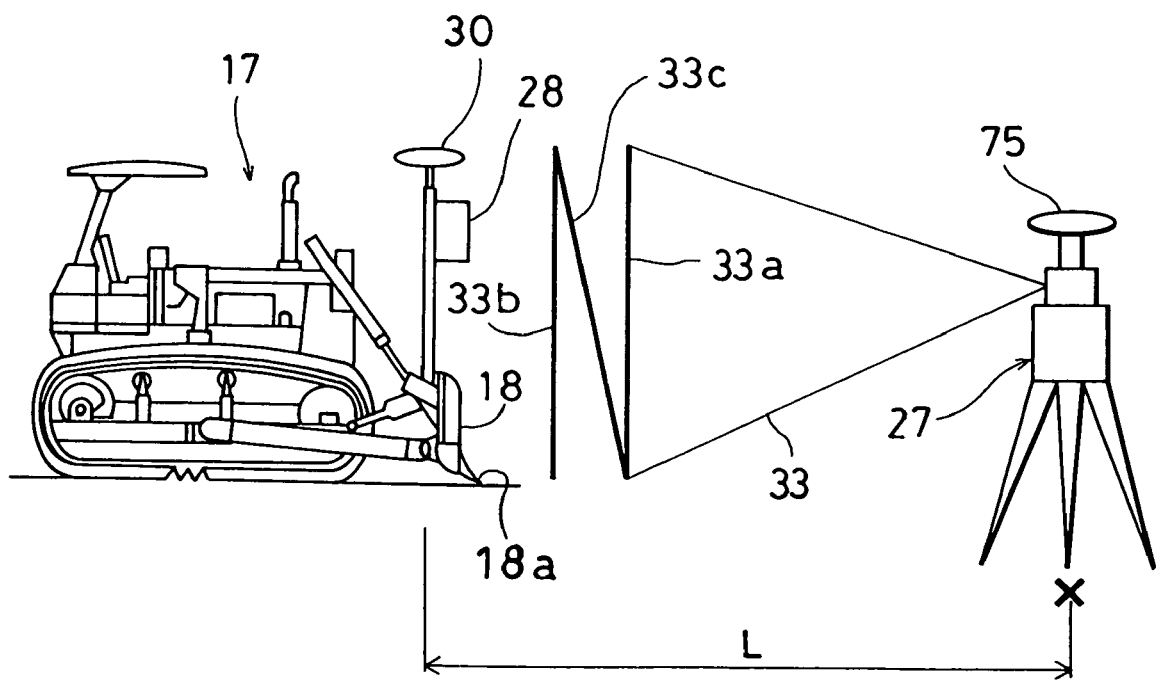
FIG. 15 is a schematical drawing of a sixth embodiment of the present invention.
Figure 16:
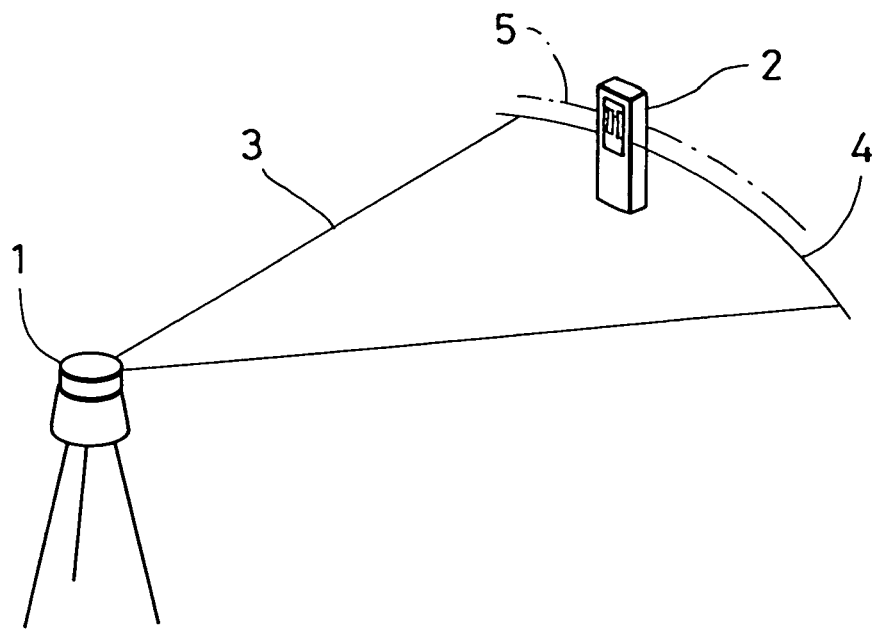
FIG. 16 is a schematical drawing of a conventional example.
Figure 17:
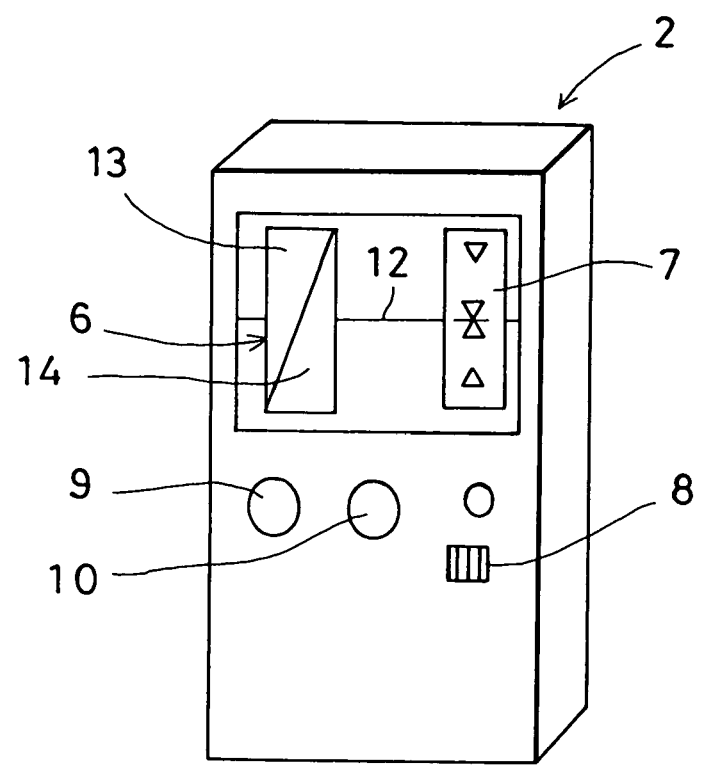
FIG. 17 a perspective view of a photodetection device of the conventional example.

FIG. 14 and FIG. 15 each represents a fifth embodiment and a sixth embodiment of the present invention. In each of these embodiments, the GPS position measuring device 75 on the rotary laser device 27 side and the GPS position measuring device 30 on the photodetection sensor device 28 side make up together a system for carrying out RTK surveying operation.

In the fifth and the sixth embodiments, the rotary laser device 27 is installed on a known point X. Coordinates of the known point X is stored in advance in the photodetection sensor device 28. The error between the coordinates of the GPS position measuring device 75 mounted on the rotary laser device 27 which is installed on the known point X and the coordinates of the known point is sent to the photodetection sensor device 28 at real time, and the coordinates of the photodetection sensor device 28 side can be obtained with high accuracy. Thus, a working position can be obtained with high accuracy.

It may be designed in such manner that the GPS position measuring device is installed on the rod 34 and is installed on the excavation tool such as the blade 18 of the bulldozer 17. These features are the same as in the third and the fourth embodiments as shown in FIG. 12 and FIG. 13 respectively.

As another embodiment of the invention, the embodiments shown in FIG. 12 and FIG. 13 may be combined with the embodiments shown in FIG. 14 and FIG. 15.

The present invention provides a working positioning measuring device, which comprises a rotary laser device for irradiating and rotating a laser beam and a photodetection sensor device for receiving the laser beam and for detecting a working position, wherein the rotary laser device comprises a laser projector for projecting at least two fan-shaped beams with at least one beam tilted, and the photodetection sensor device comprises at least one photodetection unit for receiving the fan-shaped beams and an arithmetic unit for calculating an elevation angle relative to the rotary laser device based on photodetection signals produced when the photodetection unit receives the light beam. As a result, photodetection range of the photodetection unit is expanded, and operation can be carried out with only one photodetection unit. The manufacturing cost of the device can be reduced, and the device of the same structure can be used for indoor as well as outdoor operation, and high working efficiency can be assured.

Also, the present invention provides the working position measuring system as described above, wherein the photodetection sensor device comprises the photodetection unit, a first GPS position measuring device in a predetermined positional relation with the photodetection unit and a storage unit for storing positional information of the rotary laser device, wherein a position of the photodetection sensor device is calculated from the stored positional information, the elevation angle relative to the rotary laser device, and a detection position of the first GPS position measuring device. As a result, an absolute position of the photodetection sensor device and the reference plane can be easily calculated.

Further, the present invention provides the working position measuring system as described above, wherein the photodetection sensor device comprises a first GPS position measuring device in a predetermined relation with the photodetection unit and a storage unit for storing positional information of the rotary laser device, and the rotary laser device comprises a second GPS position measuring device for specifying an installation position of the rotary laser device, wherein a position of the photodetection sensor device is calculated from the positional information stored in the storage unit, the elevation angle relative to the rotary laser device and detection position of the first GPS position measuring device. As a result, even under the condition where a known point cannot be obtained in advance, surveying and working operation can be carried out with high accuracy.

Also, the present invention provides the working position measuring system as described above, wherein the rotary laser device and the photodetection sensor device comprise communication equipment, and an installation position of the rotary laser device specified by the second GPS position measuring device is transmitted to the photodetection sensor device side. As a result, the burden on the operator can be extensively reduced.

Further, the present invention provides the working position measuring system as described above, wherein the second GPS position measuring device is installed at a known point, positional information of the known point is stored in advance in the storage unit of the photodetection sensor device, and a position of the photodetection sensor device is calculated in consideration of an error between the positional information of the known point stored in the storage unit and the positional information specified by the second GPS position measuring device. As a result, dynamic operation can be carried out with high accuracy.

Also, the present invention provides the working position measuring system as described above, wherein the second GPS position measuring device forms GPS surveying with a third GPS position measuring device installed at a position other than the position of the first GPS position measuring device, the position of the second GPS position measuring device is specified as a reference point, and the position of the photodetection sensor device is calculated based on a coordinate position of the specified point and the detection of the first GPS position measuring device. As a result, accurate surveying and operation can be carried out even under the surveying condition where the known point cannot be obtained in advance.

What is claimed is:

1. A working position measuring system, comprising a rotary laser device for irradiating and rotating a laser beam and a photodetection sensor device for receiving the laser beam and for detecting a working position, wherein said rotary laser device comprises a laser projector for projecting at least two fan-shaped beams with at least one beam tilted, and a rotator for irradiating and rotating said fan-shaped beams, and said photodetection sensor device comprises at least one photodetection unit for receiving said fan-shaped beams, and a GPS position measuring device in a predetermined positional relation with said photodetection unit, and for detecting a position of said photodetection sensor device, a storage unit for storing positional information of said rotary laser device and an arithmetic unit, wherein said arithmetic unit obtains a distance from said rotary laser device to said photodetection device from said stored positional information and the detected position of said GPS position measuring device, calculates an elevation angle relative to said rotary laser device based on photodetection signals produced when said photodetection unit receives the light beam, and obtains a height of said photodetection sensor device from said elevation angle and said distance.

2. A working position measuring system according to claim 1, wherein said laser projector has a diffraction grating, and said diffraction grating divides the incident laser beam to at least two fan-shaped beams.

3. A working position measuring system according to claim 1, wherein said photodetection sensor device comprises an imput unit, and positional information of said rotary laser device is stored in said storage unit through said the imput unit.

4. A working position measuring system according to claim 1, wherein said GPS position measuring device which said photodetection sensor device comprises is a first GPS position measuring device, and said rotary laser device comprises a second GPS position measuring device for specifying an installation position of said rotary laser device and communication equipment for transmitting the installation position of said rotary laser device to said photodetection sensor device, the installation position of said rotary laser device is stored in said storage unit as positional information.

5. A working position measuring system according to claim 4, wherein said second GPS position measuring device preforms status surveying with a third GPS position measuring device installed at a position other than the position of said first GPS position measuring device, an unknown reference point is specified, and the position of said photodetection sensor device is calculated based on a coordinate position of said specified unknown reference point and the detection of said first GPS position measuring device.

6. A working position measuring system according to claim 1 or 4, wherein said photodetection sensor device and said GPS position measuring device installed on the photodetection sensor device side are operated with an excavation control unit of a construction machine, and a height position of excavation at a working position is controlled based on the height detected or calculated by said photodetection sensor device.

7. A working position measuring system according to claim 1 or 4, wherein said photodetection sensor device and said GPS position measuring device installed on said photodetection sensor device side are operated with an excavation control unit of a construction machine having working position information, and a height position of excavation at the working position is controlled based on a height detected or calculated by said photodetection sensor device.

* * * * *